Oct. 12, 1965    W. H. REED    3,211,563
STARCH COMPOSITION AND AEROSOL FORMED THEREFROM
Filed Jan. 24, 1962    2 Sheets-Sheet 1

INVENTOR.
Winston H. Reed
BY
Johnson and Kline
ATTORNEYS

3,211,563
STARCH COMPOSITION AND AEROSOL FORMED THEREFROM

Winston H. Reed, Shelton, Conn., assignor to General Aerosols, Inc., Shelton, Conn., a corporation of Connecticut
Filed Jan. 24, 1962, Ser. No. 168,414
9 Claims. (Cl. 106—213)

The present invention relates to a starch composition for use in aerosols and more particularly to an aerosol embodying such starch composition.

Heretofore, in attempting to provide starch compositions capable of being dispensed from an aerosol container under pressure of gas therein, several problems have been encountered. One problem has been the poor shelf life of the product inasmuch as most of the starch aerosols increase in viscosity, after standing a predetermined time on the shelf or in the warehouse, to a point that they could not be dispensed as an aerosol. Also, there is a tendency for the starch to become grainy while in storage or on the shelf resulting in such sedimentation as will clog the fine passages in the aerosol valves. Another problem where germicides are used resides in the inability to get them into the solution.

The present invention overcomes this problem by providing a composition whose viscosity does not increase or become grainy while the product is in storage and which maintains the germicides in the solution. This is accomplished by having a starch composition which comprises essentially starch, alcohol and water so proportioned as to have a stable or even a decreasing viscosity over a reasonable shelf life or storage period.

This composition when combined in a container with a hydrocarbon propellant, preferably an isobutane or n-butane, forms an aerosol composition capable of being readily dispensed from the container in an aerosol form.

A feature of the invention resides in the fact that the alcohol in the composition increases the solubility of a germicide, such as hexachlorophene, when added thereto to produce a thorough dispersion thereof in the composition.

A further feature resides in the fact that the alcohol in the starch composition improves the distribution of any alcohol soluble perfumes which may be desired in the starch composition. The composition may have other additives, such as the usual fungicides, ironing aids, optical brightener and bluing dyes, added thereto without affecting the property of maintaining the uniform viscosity of the product.

Other features and advantages of the invention will be apparent from the specification and claims when considered in connection with the accompanying drawings in which:

It has been found that by adding alcohol to starch-water compositions that a basic composition is provided which is more suitable for use in an aerosol dispenser because of increased shelf life since it prevents an increase in viscosity of the composition with time which would interfere with proper dispensing thereof as an aerosol. The viscosity of the basic composition should be between 10 and 40 centipoises, and preferably about 20 centipoises. The specific percentages of the composition are in part determined by the type or characteristics of the valves to be used with the aerosol containers from which the composition is to be dispensed, i.e., the orifice size, length of passages and discharge button design.

Figure 1:
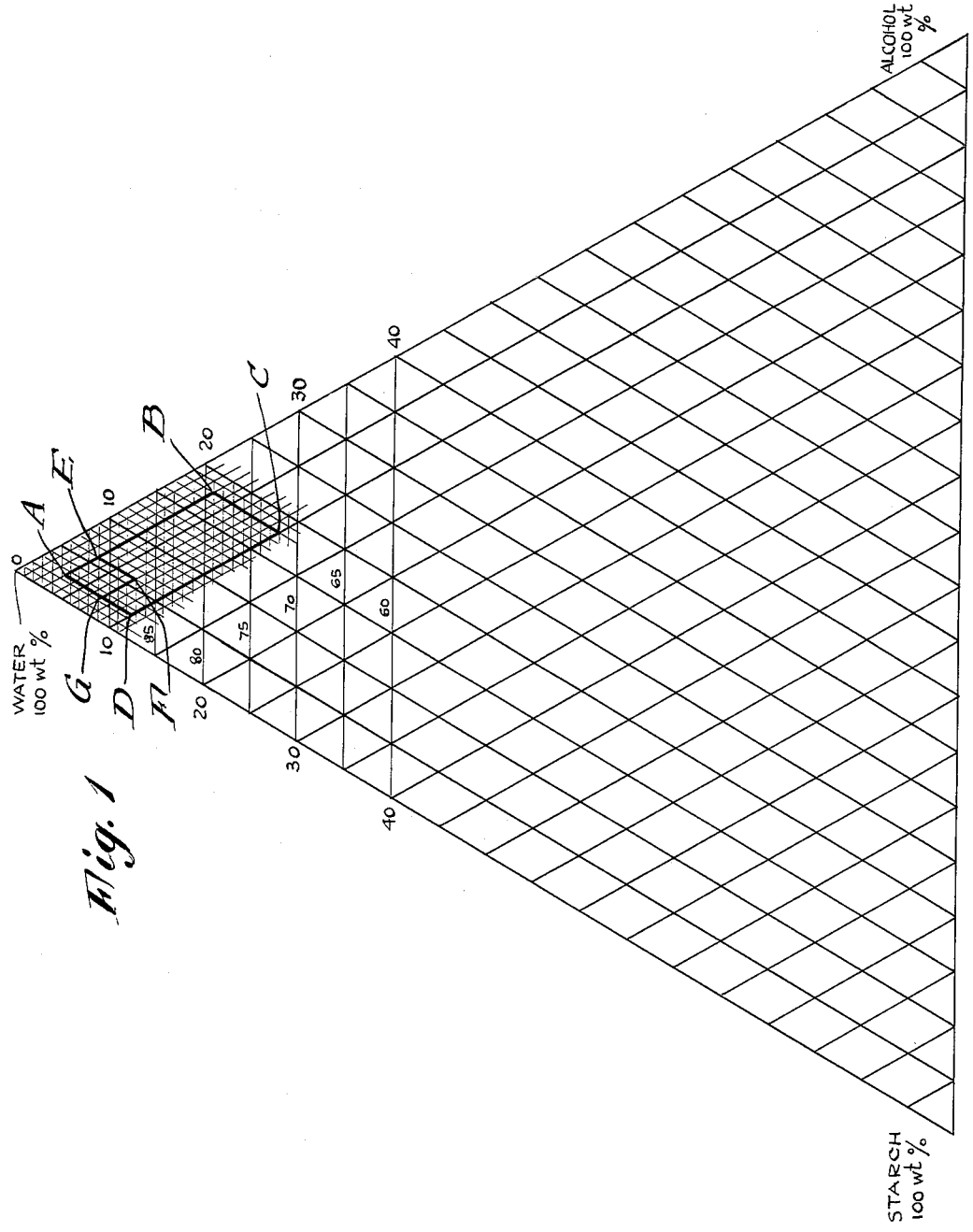
FIGURE 1 is a starch-water-alcohol mixture chart.

As shown in FIG. 1, the permissive range of the components of the basic starch-water-alcohol composition is indicated by the area A–B–C–D showing the following percentages by weight: starch 3–10%, alcohol 2.5–18%, water 72–95%, with the preferred area being A–E–F–G showing the following percentages by weight: starch 2–7%, alcohol 2.5–6%, water 87.5–95%.

While the various types of starch, such as rice, potato and tapioca, have been used, it is at present preferred to use a cornstarch which is cooked and which has been mechanically worked or sheared. The alcohol in the composition is selected from the group consisting of isopropyl alcohol and ethyl alcohol.

Figure 2:
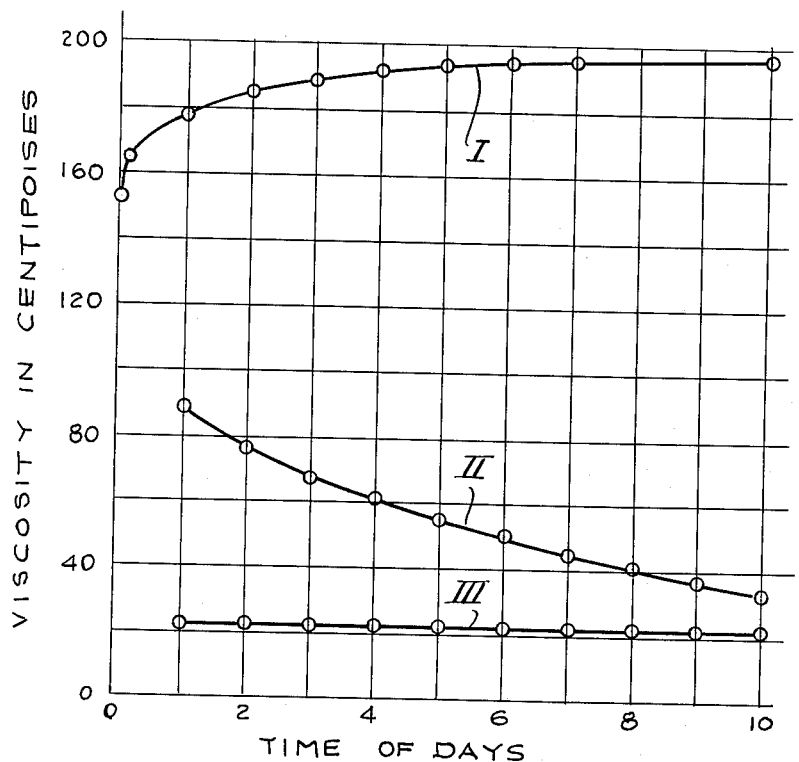
FIG. 2 is a time chart showing the change in viscosity, with time, of various starch compositions.

The components of the basic composition can be mixed to form a super concentrate having a viscosity of between 50 and 3000 centipoises and then diluted to the required viscosity or they can be mixed thoroughly in the final desired proportions and produce a composition having a viscosity which either decreases or maintains a uniform level through the period of a normal shelf life. This is graphically shown in FIG. 2 wherein curve I shows a starch-water composition having 6.7% by weight starch and no alcohol. It will be noted that the viscosity increased substantially during the shelf life. Curve II shows a composition of 5.5% by weight of starch and 5.5% by weight of isopropanol and the balance water. It will be noted that the viscosity is much lower and decreases as the time passes so as to have a viscosity which will not operate to clog and deter the dispensing of the starch after a period of normal shelf life. Curve III is for a composition having 3% by weight of starch and 3% by weight of isopropanol with the balance water. This, it will be noticed, has a steady uniform viscosity through the normal shelf life.

The use of alcohol is of substantial importance with starch types that have a high initial viscosity which impart excellent stiffness per unit weight of solution and require mechanical working or jet cooking to bring them to a sprayable range.

Other advantages of the composition having alcohol therein, when used in an aerosol spray formulation, reside in the decrease in drying time, improved wetting of the fabric and retarding or preventing the reconstitution of the starch gel in the formation which would increase the viscosity of the composition.

In starch compositions it has been desired to have a germicide. Many germicides, such as oxyquinoline sulfate, hydroxylquinoline salts, oxyquinoline benzoate, chorothymol, thymol, menthol, chloramine T, hexamethylenetetramine, quarternaries such as cetyl trimethyl ammonium bromide, methyl, ethyl, propyl, butyl and benzyl esters of parahydroxy benzoic acid and metal-organic compounds such as tributyl tin oxide, may be used for this purpose, but it is at present preferred to use hexachlorophene. While this material which is colorless is slightly soluble in water, its solubility is enhanced in the present composition due to the presence of the alcohol which causes more of the hexachlorophene to be dispersed throughout the starch and obtain a better distribution thereof. The permissive range of hexachloropene is between .0008 and .052% by weight, with the preferred amount of the basic composition to be between .001 and .052% by weight.

Examples of starch compositions made in accordance with the present invention are as follows:

*Example I*

| | percent by weight |
|---|---|
| Starch | 5.0000 |
| Alcohol | 4.0000 |
| Germicide | .0015 |
| Additives | .3200 |
| Water | 90.6785 |

*Example II*

| | percent by weight |
|---|---|
| Starch | 3.0000 |
| Alcohol | 10.0000 |
| Germicide | .0020 |
| Additives | .5100 |
| Water | 86.488 |

*Example III*

| | percent by weight |
|---|---|
| Starch | 8.0000 |
| Alcohol | 3.0000 |
| Germicide | .0008 |
| Additives | .8060 |
| Water | 88.1932 |

When forming a starch composition to be dispensed as an aerosol, the basic composition has some of the water replaced by a hydrocarbon propellant such as dichlorodifluoromethane (F-12) or a butane, used singly or in combination. Preferably, the propellant is an n-butane or isobutane since it enhances the solubility of the ingredients, except starch, in the composition. This was shown by a test wherein said ingredients were dissolved in various propellants. The n-butane or isobutane produced clear solutions. The F-12 solution was slightly turbid while other propellants produced turbid or not clear solutions. This solubility effect on the hexachlorophene greatly aids the alcohol in causing the hexachlorophene to go into a thorough dispersion in the starch solution and produces a starch product which has excellent germicidal properties and greatly inhibits growth of bacteria.

Examples of aerosol compositions made in accordance with the present invention are as follows:

*Example I*

| | percent by weight |
|---|---|
| Starch | 4.6000 |
| Alcohol | 3.6800 |
| Germicide | .0014 |
| Additives | .2944 |
| Isobutane or n-butane | 4.8000 |
| F-12 | 3.2000 |
| Water | 83.4242 |

*Example II*

| | percent by weight |
|---|---|
| Starch | 2.8800 |
| Alcohol | 9.5000 |
| Germicide | .0019 |
| Additives | .4895 |
| Isobutane or n-butane | 4.0000 |
| Water | 83.1286 |

It will be seen, therefore, that the basic starch composition and aerosol made therefrom, in accordance with the present invention, provide an improved aerosol starch composition which does not increase in viscosity with the passage of time, has good shelf life, is capable of producing a good spray pattern, has improved properties in wetting the fabric to which it is applied, dries rapidly and has a high dispersion of germicide therein, all of which properties produce an improved aerosol starch compound which can be readily dispensed.

Variations and modifications may be made within the scope of the claims and portions of the improvements may be used without others.

I claim:

1. A starch composition for use in aerosol compositions consisting essentially of from 3 to 10% by weight of starch, 2.5 to 18% by weight of a lower aliphatic alcohol selected from the group consisting of isopropyl alcohol and ethyl alcohol and 72 to 95% by weight of water, said composition having a relatively low viscosity which is within the range of 10 to 40 centipoises and which does not substantially increase under storage.

2. A starch composition according to claim 1 which also includes from 0.0008 to 0.052% by weight of a germicide the solubility of which is increased in the composition by the presence of the lower aliphatic alcohol.

3. A starch composition according to claim 2 in which the germicide comprises hexachlorophene.

4. A starch composition for use in aerosol compositions consisting essentially of 2 to 7% by weight of starch, 2.5 to 6% by weight of a lower aliphatic alcohol selected from the group consisting of isopropyl alcohol and ethyl alcohol and 87.5 to 95% by weight of water, said composition having a relatively low viscosity which is within the range of 10 to 40 centipoises and which does not substantially increase under storage.

5. A starch composition according to claim 4 which also includes from 0.001 to 0.052% by weight of a germicide the solubility of which is increased in the composition by the presence of the lower aliphatic alcohol.

6. An aerosol starch composition for use in aerosol dispensers consisting essentially of from 3 to 10% by weight of starch, 2.5 to 18% by weight of a lower aliphatic alcohol selected from the group consisting of isopropyl alcohol and ethyl alcohol, 72 to 95% by weight of water and 2 to 10% by weight of a hydrocarbon propellant, said composition having a relatively low viscosity which is within the range of 10 to 40 centipoises and which does not substantially increase under storage.

7. An aerosol composition according to claim 6 in which the hydrocarbon propellant is selected from the group consisting of dichlorodifluoromethane, isobutane and n-butane.

8. An aerosol starch composition for use in aerosol dispensers consisting essentially of 2 to 7% by weight of starch, 2.5 to 6% by weight of a lower aliphatic alcohol selected from the group consisting of isopropyl alcohol and ethyl alcohol, 87.5% to 95% by weight of water and 2 to 10% by weight of a hydrocarbon propellant, said composition having a relatively low viscosity which is within the range of 10 to 40 centipoises and which does not substantially increase under storage.

9. An aerosol composition according to claim 8 in which the hydrocarbon propellant is selected from the group consisting of dichlorodifluoromethane, isobutane and n-butane.

References Cited by the Examiner

UNITED STATES PATENTS

| 2,007,137 | 7/35 | Abrams | 252—15 |
|---|---|---|---|
| 2,524,590 | 10/50 | Bol | 106—271 |
| 2,641,525 | 6/53 | Walter et al. | 106—38.23 X |
| 2,796,354 | 6/57 | Fuller | 106—213 |
| 2,876,125 | 3/59 | Miley et al. | 106—213 |
| 2,964,165 | 12/60 | Riley | 252—305 X |
| 2,968,628 | 1/61 | Reed | 252—305 |
| 2,996,498 | 8/61 | Jarowenko | 260—233.3 |
| 3,066,037 | 6/62 | Curtin et al. | 106—213 |
| 3,102,054 | 8/63 | Harris | 260—233.3 X |

ALEXANDER H. BRODMERKEL, *Primary Examiner.*

JOHN H. MACK, MORRIS LIEBMAN, *Examiners.*

UNITED STATES PATENT OFFICE
CERTIFICATE OF CORRECTION

Patent No. 3,211,563                          October 12, 1965

Winston H. Reed

It is hereby certified that error appears in the above numbered patent requiring correction and that the said Letters Patent should read as corrected below.

Column 3, after line 5, insert the following paragraph:

The usual additives of an aerosol starch can be added to the basic composition without destroying the property of maintaining the uniform desired viscosity over a period of time. Such additives are ironing aids, fungicides, optical brightners, perfumes and bluing dyes. Since such perfumes are usually alcohol soluble perfumes, the alcohol in the basic starch composition will cause the perfume to be more uniformly dispersed throughout the composition. These additives usually comprise a total percentage thereof of from .3 to .8% by weight as desired. The use of ironing aids, fungicides or preservatives, optical brighteners or bluing dyes and perfumes in starch compositions is conventional in the art and any number of various materials known for the purpose may be used, examples of such materials being disclosed for instance in U. S. Patent No. 2,994,615.

Signed and sealed this 11th day of October 1966.

(SEAL)
Attest:

ERNEST W. SWIDER                        EDWARD J. BRENNER
Attesting Officer                      Commissioner of Patents